(12) United States Patent
Aiello

(10) Patent No.: US 6,949,852 B2
(45) Date of Patent: Sep. 27, 2005

(54) LOW PROFILE THRUST JOURNAL PLATE FLUID DYNAMIC BEARING MOTOR

(75) Inventor: Anthony Joseph Aiello, Aptos, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/267,351

(22) Filed: Oct. 8, 2002

(65) Prior Publication Data

US 2003/0230944 A1 Dec. 18, 2003

Related U.S. Application Data

(60) Provisional application No. 60/388,404, filed on Jun. 12, 2002.

(51) Int. Cl.[7] .................................. H02K 5/16
(52) U.S. Cl. ........................ 310/90; 310/67 R
(58) Field of Search ............ 310/90, 90.5, 67 R; 384/107, 121, 123

(56) References Cited

U.S. PATENT DOCUMENTS

| | | | |
|---|---|---|---|
| 5,142,173 A | | 8/1992 | Konno et al. |
| 5,223,758 A | | 6/1993 | Kataoka et al. |
| 5,977,676 A | * | 11/1999 | Wijdenes .................. 310/90 |
| 6,066,903 A | * | 5/2000 | Ichiyama .................. 310/90 |
| 6,097,121 A | * | 8/2000 | Oku ........................ 310/91 |
| 6,121,703 A | * | 9/2000 | Kloeppel et al. ......... 310/90 |
| 6,181,039 B1 | | 1/2001 | Kennedy et al. |
| 6,292,328 B1 | | 9/2001 | Rahman et al. |
| 6,307,293 B1 | | 10/2001 | Ichiyama |
| 6,313,987 B1 | | 11/2001 | Shuo-Hao et al. |
| 6,339,270 B1 | | 1/2002 | Yoshikazu |
| 2001/0036327 A1 | | 11/2001 | Masayuki et al. |
| 2002/0051587 A1 | | 5/2002 | Masayuki et al. |
| 2002/0060501 A1 | | 5/2002 | Menachem |

FOREIGN PATENT DOCUMENTS

WO     WO 02/29803 A     4/2002

OTHER PUBLICATIONS

International Search Report mailed Dec. 3, 2003, for PCT patent application no. PCT/US03/18781, filed Jun. 12, 2003; 3 pages.

* cited by examiner

*Primary Examiner*—Thanh Lam
(74) *Attorney, Agent, or Firm*—Morrison & Foerster LLP (57) ABSTRACT

The present invention provides a fluid dynamic bearing on a thrust plate of a hub/shaft/thrust plate assembly suitable for use in ultra small form factors having limited axial space.

20 Claims, 9 Drawing Sheets

LOW PROFILE THRUST JOURNAL PLATE FLUID DYNAMIC BEARING MOTOR

CROSS-REFERENCE TO RELATED APPLICATIONS

This application claims priority to U.S. Provisional Application Ser. No. 60/388,404, filed Jun. 12, 2002; entitled, "Low Profile Thrust Journal Plate FDB Motor". The foregoing patent application, which is assigned to the assignee of the present application, is incorporated herein by reference in its entirety.

BACKGROUND OF THE INVENTION

Disk drive memory systems have been used in computers for many years for storage of digital information. Information is recorded on concentric memory tracks of a magnetic disk medium, the actual information being stored in the form of magnetic transitions within the medium. The disks themselves are rotatably mounted on a spindle, the information being accessed by means of read/write heads generally located on a pivoting arm which moves radially over the surface of the disk. The read/write heads or transducers must be accurately aligned with the storage tracks on the disks to ensure proper reading and writing of information.

During operation, the disks are rotated at very high speeds within an enclosed housing by means of an electric motor generally located inside the hub or below the disk. One type of motor in common use is known as an in-hub or in-spindle motor. Such known in-spindle motors typically have a spindle mounted by means of two ball bearing systems to a motor shaft disposed in the center of the hub. One of the bearings is typically located near the top of the spindle and the other near the bottom of the spindle. These bearings allow for rotational movement between the shaft and the hub while maintaining accurate alignment of the spindle to the shaft. The bearings themselves are normally lubricated by grease or oil.

The conventional bearing system described above is prone, to several shortcomings. First is the problem of vibration generated by the balls rolling on the raceways. Ball bearings used in hard disk drive spindles run under conditions that generally guarantee physical contact between raceways and balls, despite the lubrication layer provided by the bearing oil or grease. Bearing balls running on microscopically uneven and rough raceways transmit vibrations to the rotating disk. The vibration results in misalignment between the data tracks and the read/write transducer, limiting the data track density and overall performance of the disk drive system.

Moreover, mechanical bearings are not always scalable to smaller dimensions. This is a significant drawback since the tendency in the disk drive industry has been to shrink the physical dimensions of the disk drive unit.

An alternative to conventional ball bearing spindle systems is a fluid dynamic bearing. In such systems, lubricating fluid—either gas (including air) or liquid—functions as the actual bearing surface between a stationary base or housing and the rotating spindle or rotating hub and a stationary surrounding portion of the motor. For example, liquid lubricants comprising oil, more complex ferro-magnetic fluids, or even air have been utilized for use in fluid dynamic bearing systems. The reason for the popularity in the use of air is the importance of avoiding the outgassing of contaminants into the sealed area of the head disk housing. However, air does not provide the lubricating qualities of oil. Its low viscosity requires smaller bearing gaps and therefore higher tolerance standards to achieve similar dynamic performance.

Thus, in the case of the fluid dynamic bearing employing a liquid lubricant, the lubricating fluid itself must be sealed within the bearing to avoid loss of lubricant which results in reduced bearing load capacity. Otherwise, the physical surfaces of the spindle and housing would come into dry contact with one another, leading to increased wear and eventual failure of the bearing system. In addition, the failure of such a seal or other effort to contain the lubricant within the bearing system could cause the entry of contaminants into the head disk interface region of the disk drive.

One shortcoming of known fluid dynamic bearing assemblies is that they frequently require long axial structural elements for supporting the axial and radial loads, as fluid dynamic bearings do not have the inherent stiffness which results from mechanical bearing assemblies. It is difficult to scale the fluid bearing assembly to fit within the smaller disk drive dimensions currently in consumer demand. In a related issue, fluid dynamic bearing assemblies suffer from the disadvantage of requiring extremely tight clearances and alignments; this burden makes it difficult to manufacture such assemblies since even a small deviation or aberration can lead to faulty bearings.

Typically, journal or radial bearings are located on the shaft. However, in 2.5 inch, 1.8 inch or 1.0 inch ultra small form factor drives, shafts must be short due to limited axial space. Such space can be as little as 3.0 mm or less. Thus, a long shaft for an adequate length of journal bearing grooves is not always feasible.

Thus, it is of interest in the art to develop a low profile fluid dynamic bearing motor that has adequate stiffness to provide proper axial and radial positioning of the hub/shaft/thrust plate assembly. In addition, it is of interest to develop a motor that conserves power.

SUMMARY OF THE INVENTION

Ultra small form factors, such as 1.8 inch drives, are extremely limited in their height. The present invention creates a fluid bearing on two or three surfaces of a traditional thrust plate to provide axial, radial, and angular stiffness. This is accomplished by removing the journal bearing typically located on the shaft and by providing a journal on the outer diameter of the thrust plate. The present invention provides a low profile sleeve/thrust plate/shaft assembly since it is not necessary to have a long shaft to accommodate a journal bearing. Instead, radial stiffness is provided by the grooved bearing on the thrust plate outer diameter. Such a configuration conserves power without compromising radial stiffness since the journal bearing can be, when placed on the outer diameter of the thrust plate, better aligned axially with the rotor center of gravity than when the journal bearing is placed on the outer diameter of the shaft. While especially useful in small form factor disc drives, the concepts herein are useful in drives of all sizes and may be included in fluid bearings used in environments other than motors.

Thus, the invention provides a thrust plate for use in a spindle motor in a disk drive having a cylindrical shape with bearing grooves on its outer circumference. In addition, a shaft extends from either the top end or the bottom end of the thrust plate. In addition, there may be bearing grooves located on at least one of the top surface of the thrust plate or the bottom surface of the thrust plate.

In addition, the present invention provides a fluid dynamic bearing comprising a thrust plate that has first and second axial surfaces and an outer diameter. There are grooves on the outer diameter of the thrust plate and there is a shaft that extends from the first axial surface of the thrust plate. In addition to the shaft and thrust plate, there is a counter plate with an axial surface that faces the second axial surface of the thrust plate across a gap. Further, there is a sleeve coupled to the counter plate and that is supported for rotation relative to the shaft and thrust plate. In the present invention, when the phrase "supported for rotation relative to" is used, it means that either the shaft and thrust plate are stationary and the sleeve and counter plate are rotating, or the shaft and thrust plate are rotating and the sleeve and counter plate are stationary.

The sleeve further defines a surface facing the first axial thrust plate surface and the outer diameter surface of the thrust plate. There is fluid in the gaps between the sleeve surfaces. The fluid aids in supporting the sleeve. The thrust plate may have, in addition to grooves on the outer diameter, grooves on one or both axial surfaces. Alternatively, there may be bearing grooves on the structures adjacent to the axial surfaces of the thrust plate; that is, the sleeve or the counter plate. If there are grooves on one axial surface, the fluid dynamic bearing motor will further include means for establishing an axial magnetic bias force between the thrust plate and one of the sleeves or counter plates, depending on the configuration of the system. If there are grooves on both axial surfaces, an additional magnetic bias force is not needed.

DETAILED DESCRIPTION OF THE DRAWINGS

Reference now will be made in detail to exemplary embodiments of the invention, examples of which are illustrated in the accompanying drawings. While the invention will be described in conjunction with these embodiments, it is to be understood that the described embodiments are not intended to limit the invention solely and specifically to those embodiments, or to use such embodiments solely in the disk drives that are illustrated. On the contrary, the invention is intended to cover alternatives, modifications and equivalents that may be included within the spirit and scope of the invention as defined by the attached claims. This invention is particularly useful in small form factor disk drives; however, the concepts herein are useful in drives of all types and sizes, and can be included in fluid bearings used in environments other than motors.

Further, hard disk drives are well known to those of skill in this field. In order to avoid confusion while enabling those skilled in the art to practice the claimed invention, this specification omits details with respect to known items.

Figure 1:
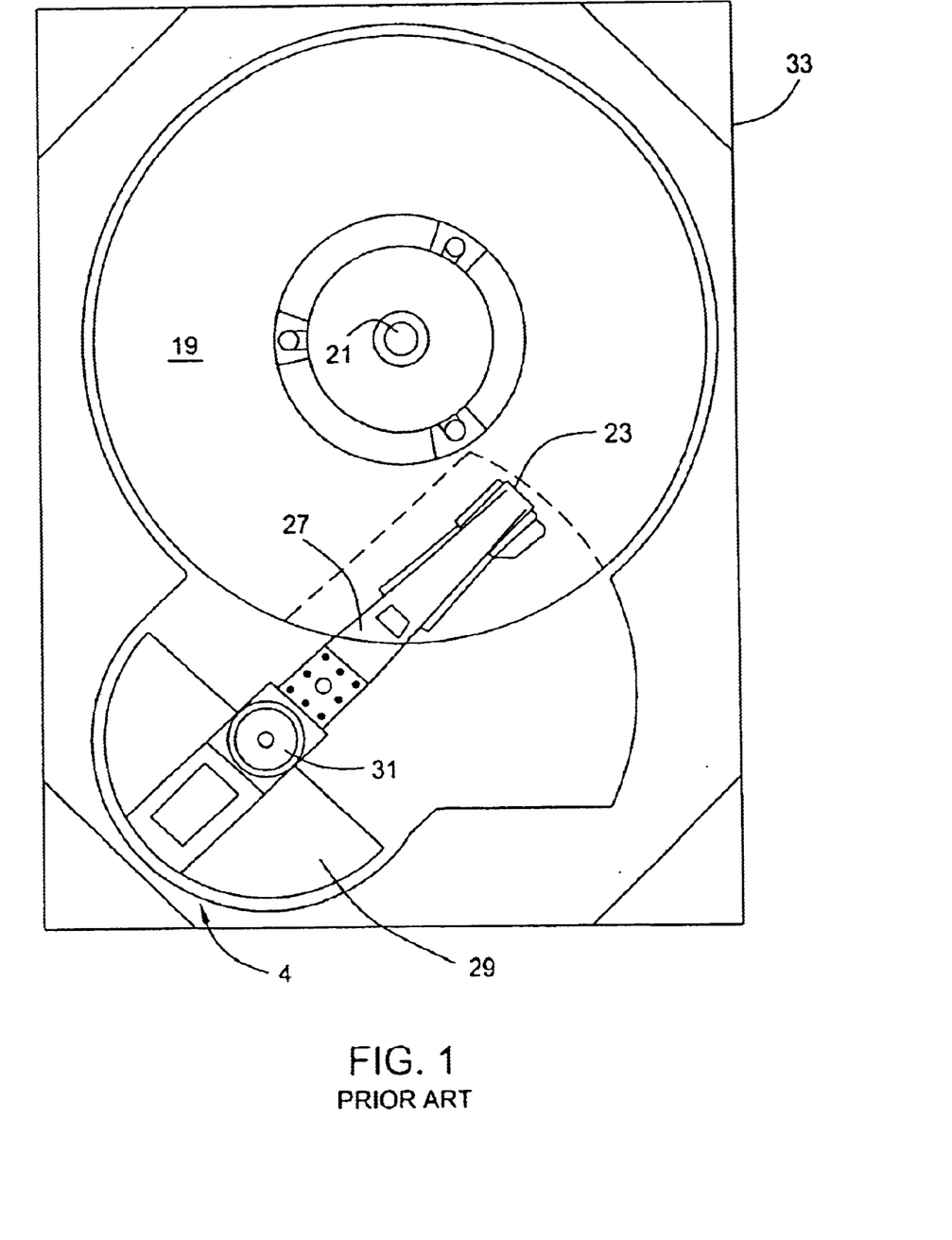
FIG. 1 is a top plan view of a known disk drive in which the low profile thrust journal plate of the present invention is especially useful.

A simple plan view of a disk drive of the type in which the hub/shaft/plate assembly of the present invention is useful is shown in FIG. 1. This view illustrates the basic elements of the drive, including a rotating disk 19, which is rotated by the spindle 21 of a spindle assembly to be described in further detail. As the disks rotate, a transducer 23 mounted on an end of an actuator arm 27 is positioned selectively by a voice coil motor 29 rotating about a pivot 31 (collectively, transducer assembly) to move the transducer 23 from track to track over the surface of the disk.

Figure 2:
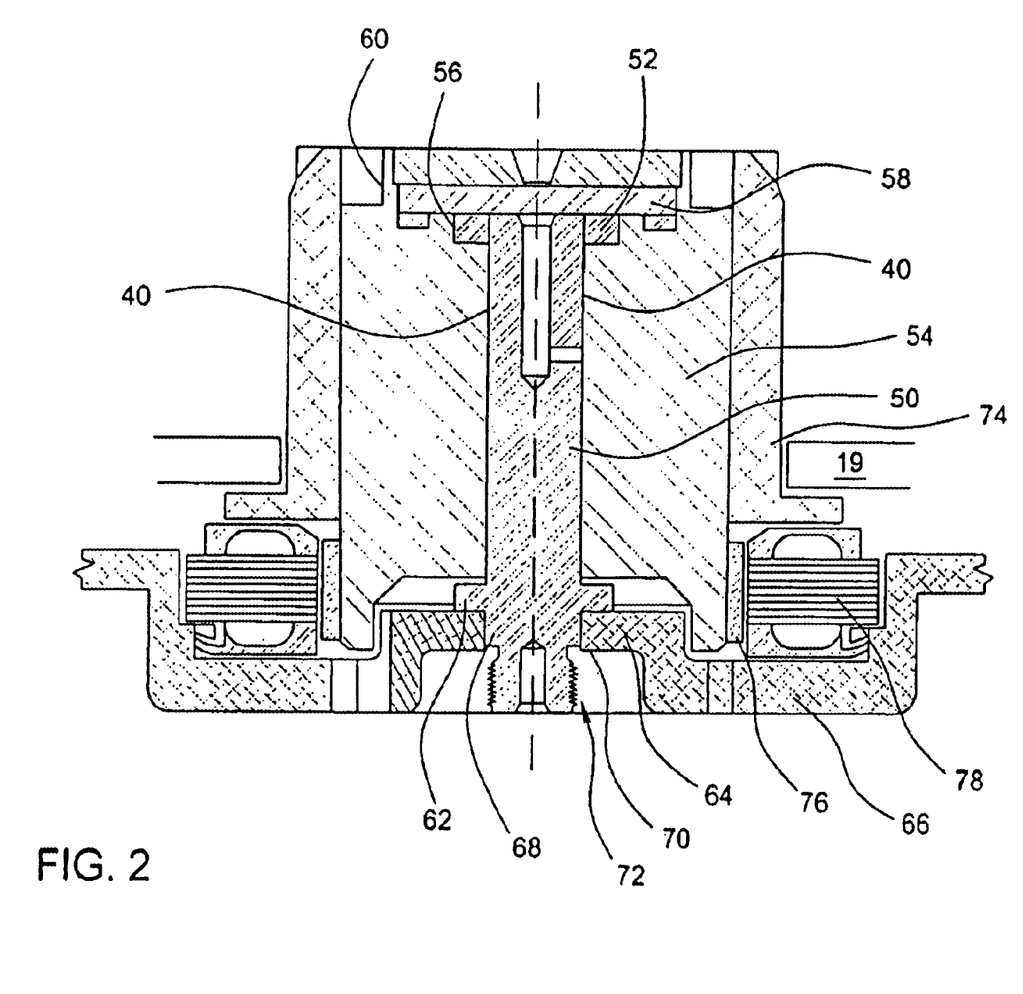
FIG. 2 is a vertical sectional view of a fluid dynamic bearing incorporated in a disk drive.

FIG. 2 is a vertical sectional view of a fluid dynamic bearing incorporated in a disk drive. FIG. 2 shows a spindle motor including a central fixed shaft 50 having a thrust plate 52 on one end. The shaft/thrust plate structure may be a single integral part or it may be two or more parts fabricated separately and subsequently coupled together to form a shaft/thrust plate structure. One such configuration is a thrust plate that is a ring shape, with the shaft coupled to the inner diameter of the thrust plate ring. The shaft 50 is fixed relative to the rotating sleeve 54. The thrust plate 52 sits within a recess 56 defined by the sleeve 54 and a counter plate 58 supported on the sleeve 54. It can be seen that the counter plate 58 is fixed in place on the sleeve 54 by being pressed or similarly fixed inside a shoulder 60 on the hub sleeve 54. Journal or radial bearing 40 is located in a gap between the shaft 50 and the sleeve 54. Grooves are located on either the outer wall of shaft 50 or the inner wall of sleeve 54. Fluid fills the gap in the radial bearing 40.

At the opposite end of the shaft 50, the shaft includes a shoulder 62 which rests on an upraised portion 64 of the base 66 in which the motor is mounted. A shaft extension 68 extends through an opening 70 in the base 66; and a threaded mounting end 72 of the shaft receives a nut (not shown) which fixes the shaft in place within the base. A hub 74 is supported on the outside of the sleeve 54, and a magnet 76 is located on the same surface of the sleeve and aligned with stator 78 supported from the base casting 66. Energization of the stator establishes a field which interacts with the magnet 76 to cause rotation of the hub. One or more disks 19 are supported on the surface of the hub. It is readily apparent that because transducer 23 (FIG. 1) flies closely over the surface of each disk 19 that it is important that the motor and hub be very stable. In a fixed shaft design, to achieve this goal, a shaft 50 of substantial diameter must be used in fixed shaft designs. The present invention is intended to provide a thrust journal plate fluid dynamic bearing assembly which achieves the goals of axial and radial stability, and which can be used in both fixed shaft and rotating shaft designs.

Thus, generally, the present invention provides a fluid dynamic bearing comprising a thrust plate that has first and second axial surfaces and an outer diameter. There are grooves on the outer diameter of the thrust plate and there is a shaft that extends from the first axial surface of the thrust plate. In addition to the shaft and thrust plate, there is a counter plate with an axial surface that faces the second axial surface of the thrust plate across a gap. Further, there is a sleeve coupled to the counter plate that is supported for rotation relative to the shaft and thrust plate. As stated previously, in the present invention when the phrase "supported for rotation relative to" is used, it means that either the shaft and thrust plate are stationary and the sleeve and counter plate are rotating, or the shaft and thrust plate are rotating and the sleeve and counter plate are stationary—i.e., the fluid dynamic bearing of the present invention is useful in both stationary and non-stationary shaft designs.

The sleeve further defines a surface facing the first axial thrust plate surface and the outer diameter surface of the thrust plate. There is fluid in the gaps between the sleeve surfaces. The fluid aids in supporting the sleeve. The thrust plate may have, in addition to grooves on the outer diameter, grooves on one or both axial surfaces. Alternatively, the bearing grooves may be located on the axial surface of the counter plate that faces the second axial surface of the thrust plate or on the surface of the sleeve that faces the first axial surface of the thrust plate. If there are grooves on one axial surface, the fluid dynamic bearing motor will further include means for establishing an axial magnetic bias force between the thrust plate and sleeve or counter plate, depending on the configuration of the system. If there are grooves on both axial surfaces, an additional magnetic bias force is not needed. FIGS. 3–9 show various embodiments of the fluid dynamic bearing described generally in this and the previous paragraphs.

Figure 3:
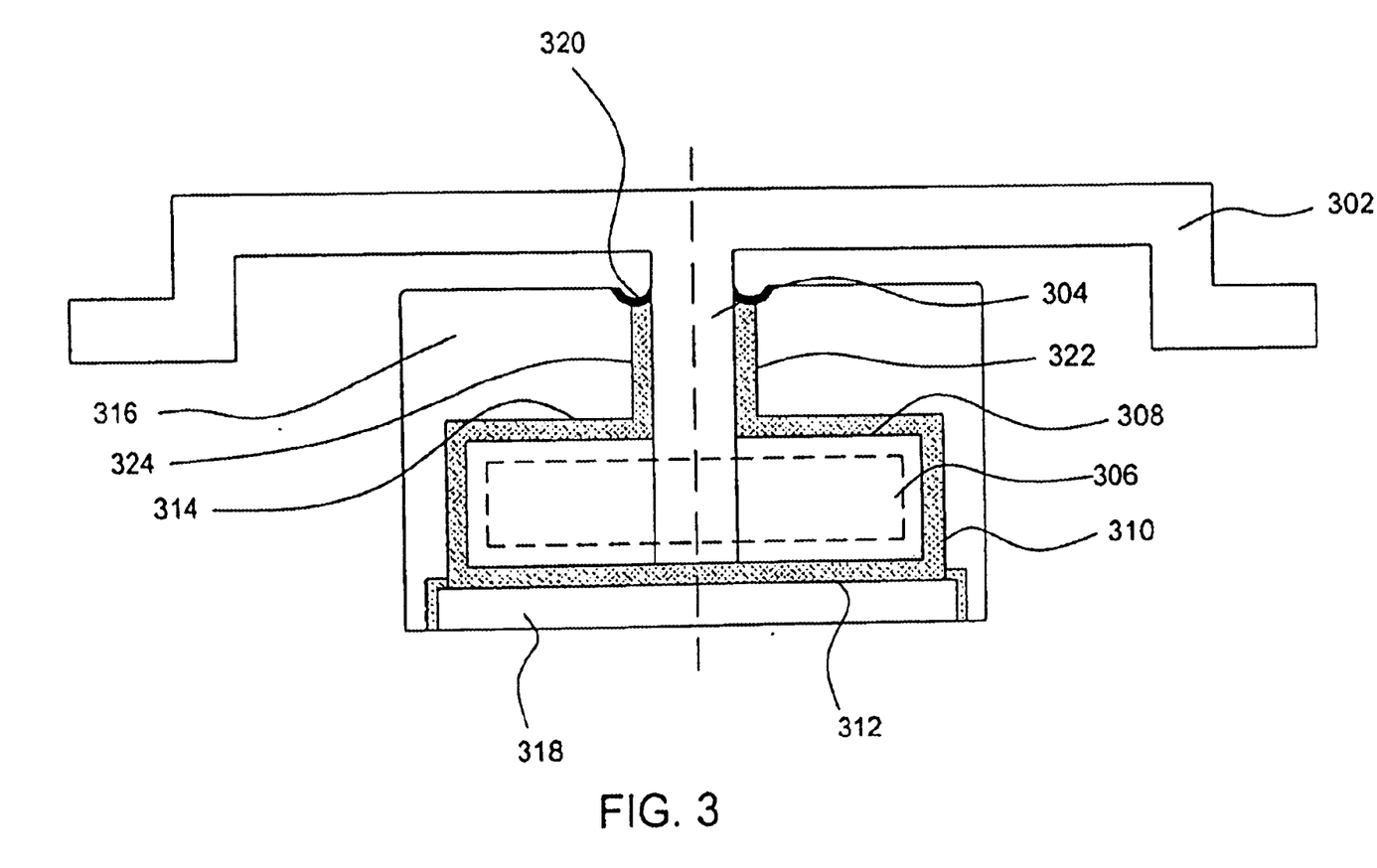
FIG. 3 is a simplified vertical cross section of a hub/shaft/thrust plate assembly.

FIG. 3 is a simplified vertical cross-section of sleeve/shaft/thrust plate assembly. FIG. 3 shows an embodiment having a rotating shaft. FIG. 3 shows hub 302 coupled to shaft 304 which is, in turn, coupled to thrust plate 306. The upper surface of thrust plate 306 is shown at 308, the outer diameter of thrust plate 306 is shown at 310, and the lower surface of thrust plate 306 is shown at 312. 314 indicates a lubricant, which is, in this case, disposed between shaft wall 324 of shaft 304 and inner wall 322 of sleeve 316. A counter plate is seen at 318 coupled to sleeve 316. Fluid is disposed in the gap between the outer surfaces 308, 310, 312 of thrust plate 306 and the facing surfaces of the sleeve 316 and counter plate 318.

In the embodiment in FIG. 3, there are three bearings on thrust plate 306. There is one radial bearing on outer diameter 310 of thrust plate 306, and two axial bearings. One of the axial bearings is on the upper surface 308 of thrust plate 306, and another axial bearing is on the bottom surface 312 of thrust plate 306. Thus, in this embodiment of the present invention, the radial fluid dynamic bearing is located on the outer diameter 310 of thrust plate 306. In reference to FIG. 2, the journal or radial bearing was located at the gap 40 between shaft 50 and sleeve 54. Thus, whereas the radial or journal bearing was located between the shaft and sleeve in prior art configurations, there are, in the present invention, no bearings located on shaft 304. Instead, there is now a lubricant 314 between the inner wall 322 of sleeve 316 and wall 324 of shaft 304. Fluid or lubricant 314 is maintained within the gap due to capillary action (seal 320).

Figure 4:
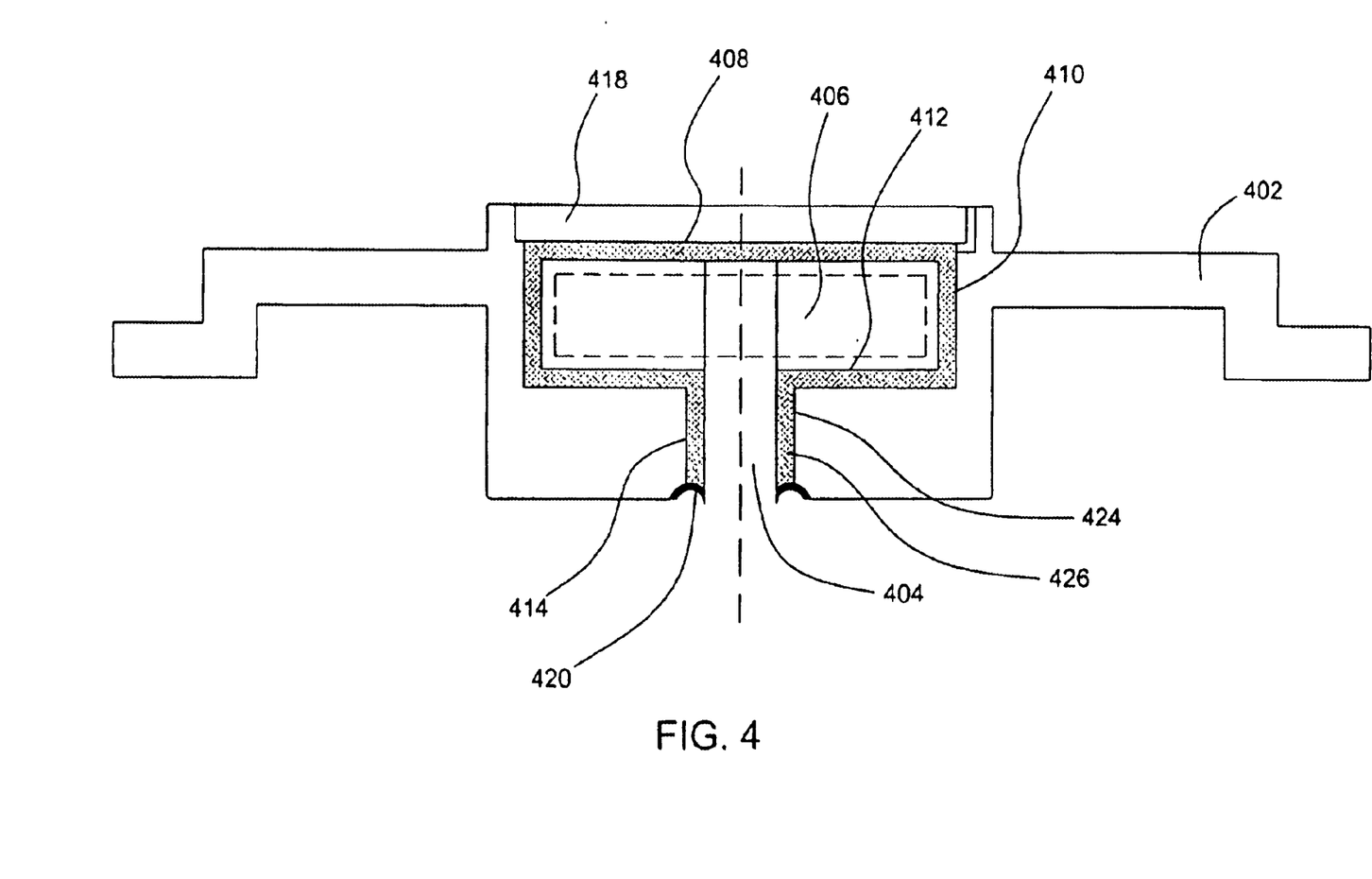
FIG. 4 is a simplified vertical cross-section of a hub/shaft/thrust plate assembly.

FIG. 4 also is a simplified vertical section of a sleeve/shaft/thrust plate assembly as described above. FIG. 4 shows an embodiment of such an assembly with a stationary shaft. FIG. 4 shows a hub 402 coupled to a counter plate 418. Shaft 404 is coupled to thrust plate 406. Thrust plate 406 has an upper surface 408, an outer diameter radial surface 410, and a lower axial surface 412. There is lubricant at 414 disposed between the inner wall 426 of hub 402 and the outer walls of the shaft 404 and thrust plate 406.

As with FIG. 3, FIG. 4 is an embodiment where there is one radial bearing on the outer diameter 410 of thrust plate 406. In addition, there are two axial thrust bearings. One of the axial thrust bearings is between the upper surface 408 of thrust plate 406 and the facing surface of counter plate 418, and other axial bearing is between bottom surface 412 of thrust plate 406 and the facing surface of sleeve section 421. Again, as with FIG. 3, where in prior art configurations a radial or journal bearing was located on the shaft, in the embodiment seen in FIG. 4, there is no radial bearing on shaft 404. Instead, the radial bearing is on outer diameter 410 of thrust plate 406. Note also that in the embodiment in FIG. 4, there is no separate sleeve. Instead, hub 402 is configured to act as a sleeve. However, in this and all other embodiments, the sleeve and the hub can be separate elements that are fastened together in any manner known in the art.

In the embodiment shown in FIG. 4, as well as the other embodiments shown in the present specification and other embodiments of the present invention not shown herein, the bearing patterns may be of any type known in the art. For example, such patterns may be chevron grooves, herringbone grooves, spiral grooves, sinusoidal grooves, and may be formed by stamping, coining, or other methods of patterning materials.

Figure 5:
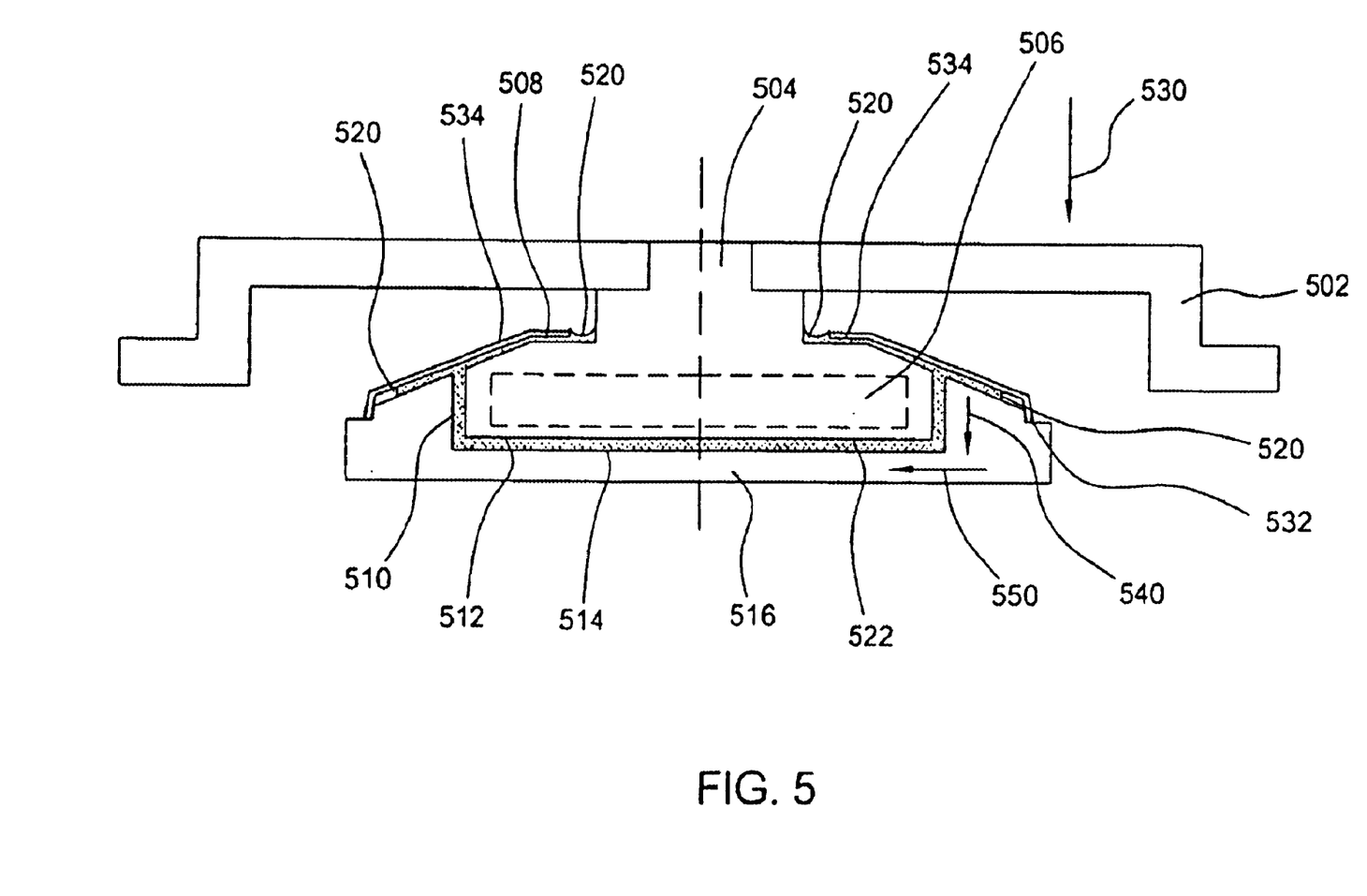
FIG. 5 is a simplified vertical cross-section of a hub/shaft/thrust plate assembly.

FIG. 5 is a simplified vertical cross-section of a hub/shaft/thrust plate assembly. FIG. 5 is an embodiment of a rotating shaft assembly. The embodiment shown in FIG. 5 shows a single thrust design instead of the two axially-opposing thrust bearings shown in FIGS. 3 and 4. FIG. 5 shows a hub 502 coupled to a shaft 504 which is, in turn, coupled to thrust plate 506. Thrust plate 506 has an upper surface 508, an outer diameter 510, and a lower surface 512. In addition, there is sleeve 516. In this case, sleeve 516 also acts as a counter plate. Additionally, there is a seal shield 532. Lubricant 514 is maintained between sleeve 516, thrust plate 506, and seal shield 532. In this embodiments, as in other embodiments, seals may be used to maintain lubricant between various components of the hub/thrust plate/shaft assembly. Such seals may be radial seals, centripetal seals, traditional capillary seals, reverse capillary seals, or other seals known in the art.

In this single thrust bearing embodiment, there is one radial bearing, again on the outer diameter 510 of thrust plate 506, and only one axial or thrust bearing. The one axial or thrust bearing is on lower surface 512 of thrust plate 506. Since there is only one thrust bearing, a bias force must be applied to the hub to maintain proper axial gap of the thrust bearing. Such bias force can be an electromagnetic force provided by a secondary magnet or a stator magnet offset (not shown). The bias force is shown at 530. In addition, lubricant pumping directions as a result of the bearings while the drive is in operation are shown at 540 and 550.

Also, seal shield 532 acts as an axial shock displacement limiter such that it covers and overhangs at its innermost section the upper surface 508 of thrust plate 506.

Figure 6:
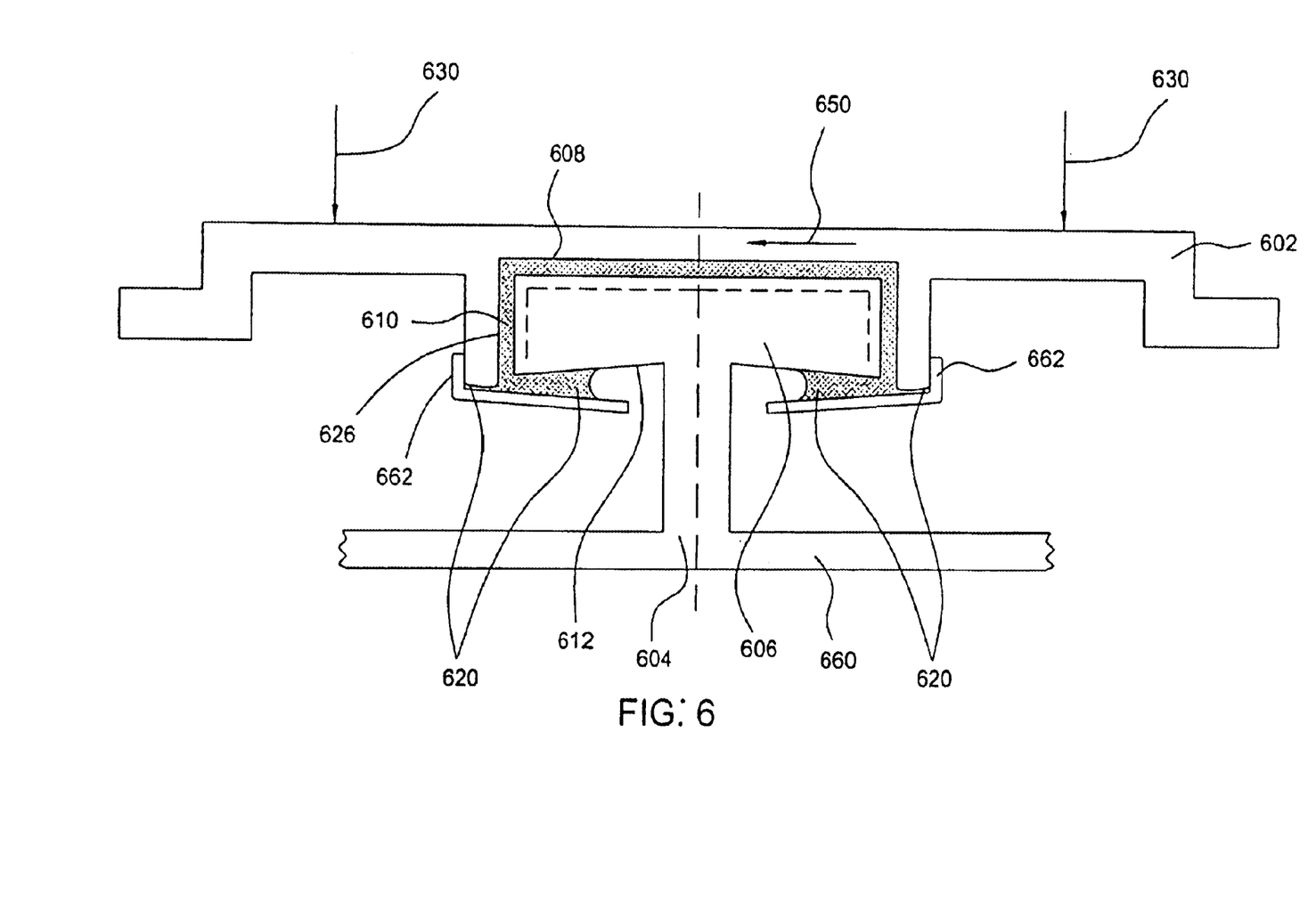
FIG. 6 is a simplified vertical cross-section of s hub/shaft/thrust plate assembly.

FIG. 6 also is a simple vertical cross-section of a hub/shaft/thrust plate assembly. having a stationary shaft. FIG. 6 shows a hub 602, and a base 660 coupled to the shaft 604 which is in turn coupled to the thrust plate 606. Thrust plate 606 has an upper surface 608, an outer diameter 610, and a lower surface 612. In addition, FIG. 6 shows a centripetal (or centrifugal) seal and limiter at 662. Fluid 614 is maintained between centripetal seal 662, thrust plate 606, and hub 602. A capillary seal is shown at 620.

Again, as in FIG. 5, there is one radial bearing on the outer diameter 610 of thrust plate 606, and one axial bearing, this time on the upper surface 608 of thrust plate 606. As with FIG. 5, a bias force is needed to maintain proper axial gap of the thrust bearing. As before, such a bias force can be supplied by an electromagnetic force.

In this embodiment, the centripetal seal and limiter 662 forms a radial capillary seal 620 meniscus. The centripetal force of the spinning rotor keeps the fluid between the centripetal seal and limiter 662 and thrust plate 606. The corresponding centrifugal force of the lubricant assists in holding it within the seal. The bias force required is shown at 630, and the net lubricant pumping directions as a result of the axial and radial bearings while the drive is in operation are shown at 640 and 650, respectively.

Figure 7:
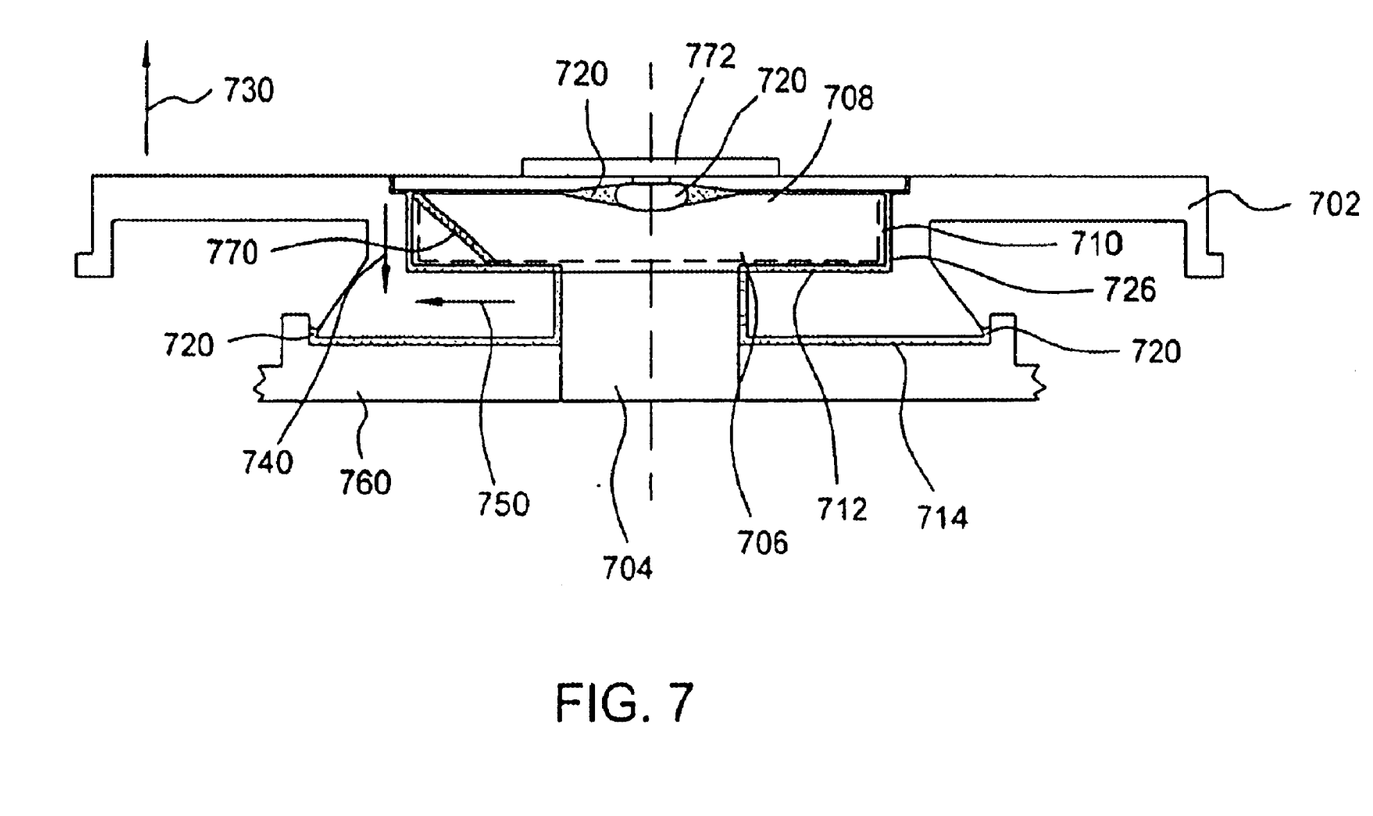
FIG. 7 is a simplified vertical cross-section of a hub/shaft/thrust plate assembly.

FIG. 7 is a simplified vertical cross-section of a sleeve/shaft/thrust plate assembly. FIG. 7 is an embodiment of stationary shaft design. FIG. 7 shows hub 702, configured to also serve as a counter plate. In addition, base 760 is coupled to shaft 704 which is coupled in turn to thrust plate 706. Thrust plate 706 has an upper surface 708, and outer diameter 710, and a lower surface 712. In addition, there is a breather label at 772. Capillary seals are shown at 720.

As in FIGS. 5 and 6, FIG. 7 has a single radial bearing on outer diameter 710 of thrust plate 706, and a single axial bearing on lower surface 712 of thrust plate 706. As before, a bias force is needed, but in this embodiment a bias force needs to go in the opposite direction. Such a bias force, again, may be supplied by electromagnetic means. Here, as in FIG. 6, a radial centripetal seal is formed between the hub 702 and the base 760. In addition, breather label 772 is placed over the radial centripetal seal to limit evaporation loss.

FIG. 7 also shows a circulation conduit 770 for lubricant 714. Circulation conduit 770 assures that lubricant is not drained completed from one area to another. Such a design is referred to a "vented" or "dual vented" design. The embodiments shown in FIGS. 3–6 do not show such a circulation path or conduit, though such a path or conduit could be included in these embodiments. The lubricant pumping directions are shown at 740 (axial force) and 750 (radial force).

Figure 8:
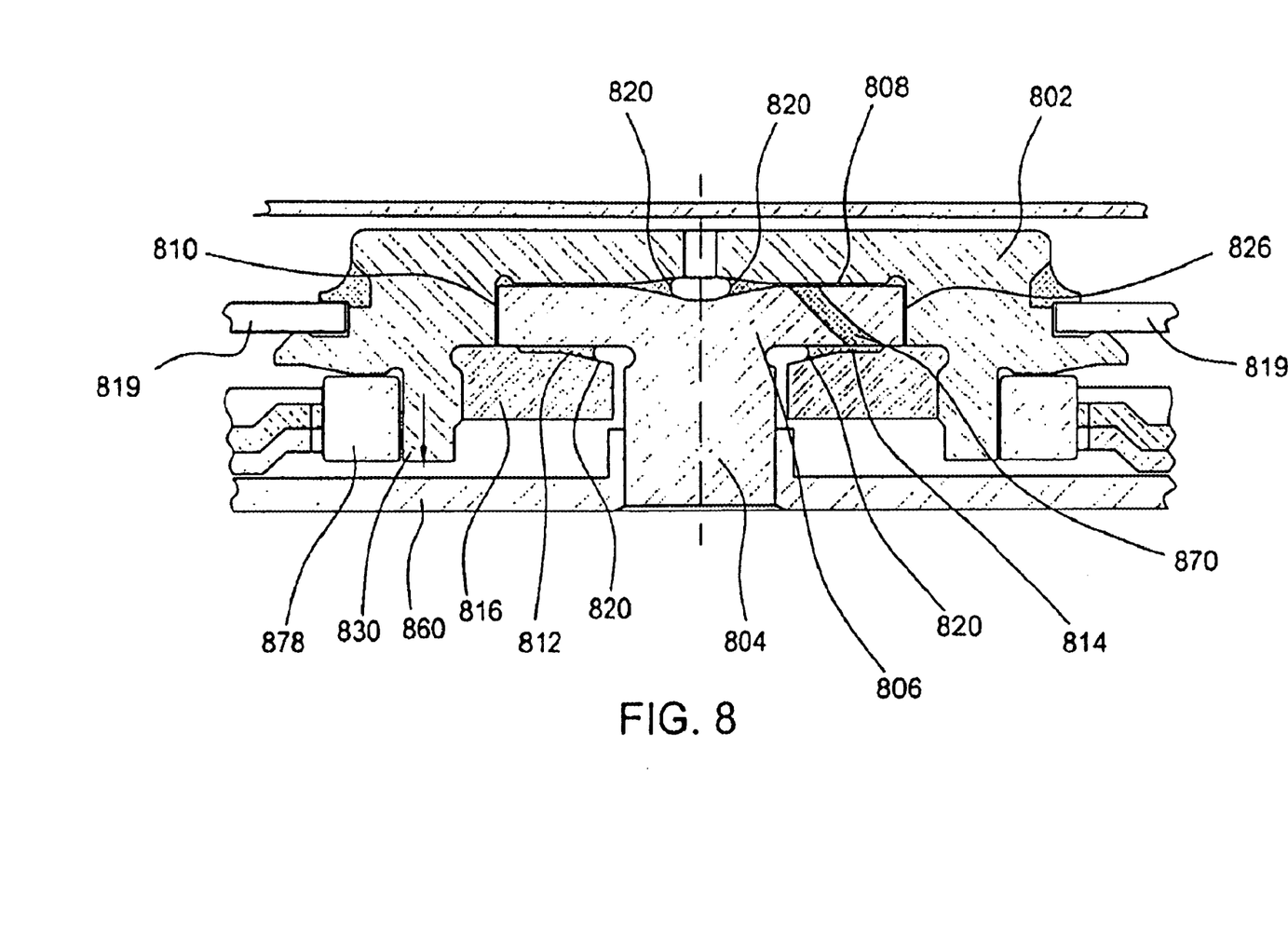
FIG. 8 is a cross-sectional view of a hub/shaft/thrust plate assembly also incorporating other features of a disk drive.

One aspect of the sleeve/thrust plate/shaft assembly should be noted. Each embodiment of the present invention presented herein includes a "sleeve-like member." For example, FIGS. 3, 5 and 8 show a sleeve at 316, 516, and 816, respectively. FIGS. 4 and 7 do not show a sleeve per se; however, the configurations of hubs 402 and 702, respectively, are such so as to act as a "sleeve" or "sleeve-like member". Even FIG. 6, though not having a sleeve, has a sleeve-like member in the combination of the configuration of hub 602 and seal 662. Thus, various embodiments of the sleeve or sleeve-like member include a hub configured to act as both a hub or counter plate and sleeve, a separate hub and sleeve that may be then coupled in some manner, a hub and seal configured to act as a sleeve, and any other configurations that supply the surfaces necessary to establish a fluid dynamic bearing. In addition, it should be noted that although grooves are shown on that outer diameter and one or both axial surfaces of the thrust plate, it could be the adjacent sleeve or counter plate surfaces that are grooved.

FIG. 8 is similar to FIG. 7. However, in addition to showing the hub 802, shaft 804, thrust plate 806, lubricant 814, base 860, sleeve integral with hub 802 (or hub 802 is configured to act as both as hub and sleeve), seal and limiter ring 816, and circulation conduit 870, note that disk 819 and magnet 878 are also shown. Again, the embodiment shown in FIG. 8 has one radial bearing on the outer diameter 810 of thrust plate 806, and one axial bearing at the upper surface 808 of thrust plate 806. Thus, as before, a bias force 830 is required.

Figure 9:
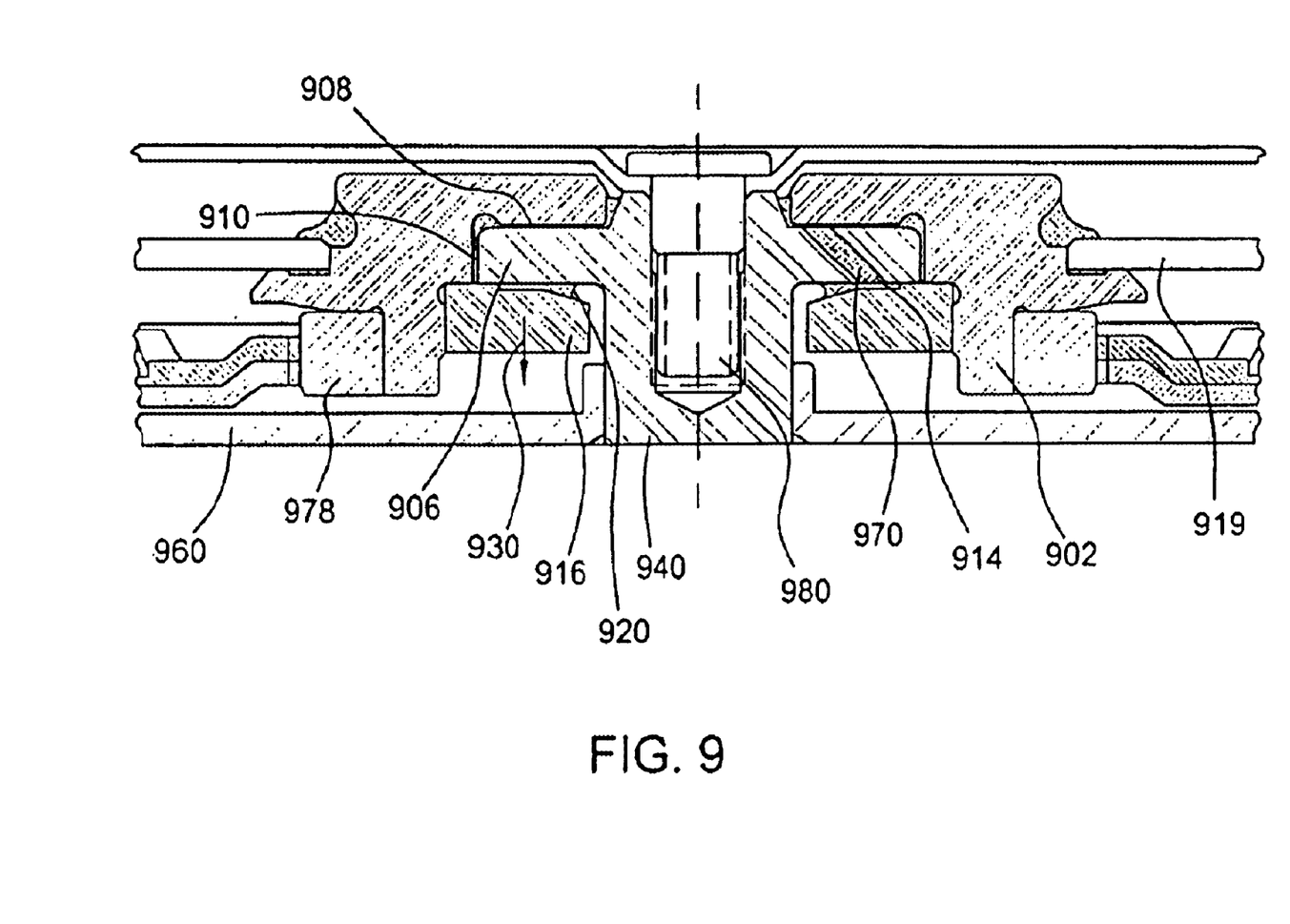
FIG. 9 is a cross-sectional view of a hub/shaft/thrust plate assembly also incorporating other features of a disk drive.

FIG. 9 is similar to FIG. 8. FIG. 9 shows a top-cover-attach fluid dynamic bearing having hub 902, shaft 904, thrust plate 906, lubricant 914, base 960, sleeve integral with hub 902 (or, another perspective is that hub 902 is configured to act as both as hub and sleeve), seal and limiter ring 916, circulation conduit 970, disk 919 and magnet 978. Again, the embodiment shown in FIG. 9 has one radial bearing on the outer diameter 910 of thrust plate 906, and one axial bearing at the upper surface 908 of thrust plate 906. Since only one axial surface has bearing grooves, a bias force 930 is required. The top-cover-attach fluid dynamic bearing embodiment of FIG. 9 is very similar to the stationary shaft embodiment shown in FIG. 8, except note that a central screw 980 couples the shaft 904 to a cover 990.

Various modifications to the assemblies disclosed herein may occur to those skilled in the art without departing from the spirit and scope of the invention as defined by the appended claims.

What is claimed is:

1. A fluid dynamic bearing system, comprising:
   an inner member;
   an outer member configured to rotate relative to the inner member;
   a thrust plate coupled to the inner member;
   a fluid dynamic journal bearing disposed along a radial surface of the thrust plate, the journal bearing configured to radially support the relative rotation of the outer member; and
   a fluid dynamic thrust bearing disposed radially inboard of the journal bearing along an axial surface of the thrust plate, the thrust bearing configured to axially support the relative rotation of the outer member;
   wherein the thrust plate includes a circulation conduit configured to accommodate bearing fluid flow induced by the journal bearing and the thrust bearing.

2. The fluid dynamic bearing system of claim 1, further comprising means for generating an axial bias force on the outer member.

3. The fluid dynamic bearing system of claim 2, wherein the axial bias force acts in a direction opposite of a force exerted on the outer member by the thrust bearing.

4. The fluid dynamic bearing system of claim 1, further comprising a first seal configured to maintain bearing fluid between the thrust plate and the outer member.

5. The fluid dynamic system of claim 4, wherein the first seal comprises a capillary seal.

6. The fluid dynamic bearing system of claim 4, further comprising a second seal configured to maintain bearing fluid between the thrust plate and the outer member.

7. The fluid dynamic bearing system of claim 6, wherein the second seal comprises a capillary seal.

8. The fluid dynamic bearing system of claim 1, wherein the axial surface comprises an upper surface of the thrust plate.

9. The fluid dynamic bearing system of claim 1, wherein the thrust plate includes a circulation conduit configured to accommodate bearing fluid flow induced by the journal bearing and the thrust bearing.

10. The fluid dynamic bearing system of claim 1, wherein the outer member includes a first surface that faces the axial surface of the thrust plate and a second surface that faces the radial surface of the thrust plate.

11. The fluid dynamic bearing system of claim 10, wherein either the thrust surface or the axial surface includes grooves thereon.

12. The fluid dynamic bearing system of claim 11, wherein the grooves comprise chevron, herringbone, spiral or sinusoidal grooves.

13. The fluid dynamic bearing system of claim 10, wherein either the second surface or the radial surface includes grooves thereon.

14. The fluid dynamic system of claim 13, wherein the grooves comprise chevron, herringbone, spiral or sinusoidal grooves.

15. The fluid dynamic bearing system of claim 1, further comprising a top cover coupled to the inner member.

16. The fluid dynamic bearing system of claim 15, wherein the outer member comprises a hub configured to support one or more discs.

17. The fluid dynamic bearing system of claim 16, further comprising a limiter ring attached to the hub and configured to limit axial displacement of the hub.

18. The fluid dynamic bearing system of claim 16, further comprising a magnet attached to the hub, the magnet axially offset from a stator to produce an axial bias force on the hub.

19. The fluid dynamic bearing system of claim 1, wherein the thrust plate includes a circulation conduit fluidly coupled to the first capillary seal and to the second capillary seal and configured to accommodate bearing fluid flow induced by the journal bearing and the thrust bearing.

20. A fluid dynamic bearing system, comprising:
   an inner member;
   an outer member configured to rotate relative to the inner member;
   a thrust plate coupled to the inner member;
   a fluid dynamic journal bearing disposed along a radial surface of the thrust plate, the journal bearing configured to radially support the relative rotation of the outer member; and
   a fluid dynamic thrust bearing disposed radially inboard of the journal bearing along an axial surface of the thrust plate, the thrust bearing configured to axially support the relative rotation of the outer member;
   wherein the thrust bearing and journal bearing are defined by a fluid containing gap; and
   wherein fluid is maintained within the gap by a single capillary seal.

* * * * *